United States Patent
Gurvich et al.

(10) Patent No.: US 11,933,350 B2
(45) Date of Patent: Mar. 19, 2024

(54) JOINTS OF COMPOSITE FRAMES FOR OPTICS SUPPORT STRUCTURE

(71) Applicant: Goodrich Corporation, Charlotte, NC (US)

(72) Inventors: Mark R. Gurvich, Middletown, CT (US); Brian J. Smith, Maynard, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/745,501

(22) Filed: May 16, 2022

(65) Prior Publication Data

US 2023/0366421 A1 Nov. 16, 2023

(51) Int. Cl.
*F16B 7/04* (2006.01)
*B29C 65/56* (2006.01)
*B29C 70/38* (2006.01)
*B29K 101/12* (2006.01)

(52) U.S. Cl.
CPC ............ *F16B 7/044* (2013.01); *F16B 7/0486* (2013.01); *F16B 7/0493* (2013.01); *B29C 65/562* (2013.01); *B29C 70/382* (2013.01); *B29K 2101/12* (2013.01); *Y10T 403/7194* (2015.01)

(58) Field of Classification Search
CPC ...... F16B 7/044; F16B 7/0486; F16B 7/0493; Y10T 403/71; Y10T 403/7194
See application file for complete search history.

(56) References Cited

U.S. PATENT DOCUMENTS

| | | | |
|---|---|---|---|
| 4,284,679 A * | 8/1981 | Blad | B29D 28/005 428/116 |
| 4,900,048 A | 2/1990 | Derujinsky | |
| 5,116,071 A * | 5/1992 | Calfee | B62K 19/16 280/281.1 |
| 5,160,682 A * | 11/1992 | Calfee | B62K 19/18 264/161 |
| 5,188,384 A * | 2/1993 | van Raemdonck | B62K 19/16 280/281.1 |

(Continued)

OTHER PUBLICATIONS

Extended European Search Report for EP Application No. 23173706.5, dated Oct. 9, 2023, 9 pages.

(Continued)

*Primary Examiner* — Matthew R McMahon
(74) *Attorney, Agent, or Firm* — Kinney & Lange, P.A.

(57) ABSTRACT

A joint for a composite frame includes a first composite rod, a first shell abutting the first composite rod, a second shell abutting the first composite rod and disposed opposite the first shell relative to the first composite rod. The first and second shells are joined together such that composite rod is fixed therebetween. A method of forming joints of composite frame includes forming a composite frame by interconnecting a plurality of composite rods formed by an Automated Fiber Placement (AFP) manufacturing method around a mandrel, applying a first shell to the plurality of composite rods at a first location where composite rods are interconnected, applying a second shell at the first location opposite the first shell relative to the composite rods, and joining the first and second shells together with the composite rods at the first location disposed between the first and second shells.

13 Claims, 9 Drawing Sheets

(56) References Cited

U.S. PATENT DOCUMENTS

| | | | | |
|---|---|---|---|---|
| 5,357,729 A * | 10/1994 | Schutze | ............... | E04H 12/02 52/847 |
| 5,678,374 A * | 10/1997 | Fukuoka | ............ | E04G 23/0218 14/74 |
| 5,944,441 A * | 8/1999 | Schutze | ............... | F16B 7/00 52/309.4 |
| 5,993,941 A * | 11/1999 | Vasiliev | ............... | B32B 3/12 428/116 |
| 6,013,341 A * | 1/2000 | Medvedev | ............... | E04B 1/36 428/36.1 |
| 6,068,902 A * | 5/2000 | Vasiliev | ............... | B64C 1/068 428/110 |
| 6,077,580 A * | 6/2000 | Vasiliev | ............... | B29C 70/32 428/377 |
| 6,155,450 A * | 12/2000 | Vasiliev | ............... | B29C 53/587 156/169 |
| 6,270,104 B1 * | 8/2001 | Nelson | ............... | B62K 19/22 280/281.1 |
| 8,397,463 B2 * | 3/2013 | Allred, III | ............ | F16B 7/0486 52/696 |
| 9,255,396 B2 * | 2/2016 | Eberhart | ............... | F16B 7/0486 |
| 10,272,991 B2 * | 4/2019 | Gurvich | ............... | B64C 25/60 |
| 10,988,226 B2 * | 4/2021 | Brin | ............... | B64B 1/08 |
| 11,091,217 B2 * | 8/2021 | Lo | ............... | B62K 19/16 |
| 2010/0192506 A1 | 8/2010 | Allred et al. | | |
| 2012/0285918 A1 * | 11/2012 | Ulle | ............... | F16B 11/008 211/182 |
| 2020/0262171 A1 | 8/2020 | Nolet et al. | | |

OTHER PUBLICATIONS

M. Gurvich, et al., US Patent Application titled "Composite Frames for Opto-Mechanical Support Structures", Assigned U.S. Appl. No. 17/679,489, filed Feb. 24, 2022, 25 pages.

\* cited by examiner

JOINTS OF COMPOSITE FRAMES FOR OPTICS SUPPORT STRUCTURE

BACKGROUND

The present disclosure relates generally to composite frames for opto-mechanical support structures and more particularly to joints for composite frames.

Fiber-reinforced polymer-matrix composite frames for opto-mechanical support structures have been developed and are being further developed to replace metallic support structures to provide benefits of reduced weight, cost, and time of fabrication. Such composite frames consist of interconnected composite rods. Structurally reliable and cost-efficient joints, connecting these composite rods, are required to connect both optics equipment to the composite frame and the composite frame to larger structural systems. Implementations of joints for composite structures often pose a significant challenge and, in many cases, are a key barrier to successful composite utilization despite the significant benefits provided by composite materials. Challenges include weak strength properties of composites in all directions but the fiber direction, usually corresponding to axial orientations of rods, manufacturing limitations of making complex joint designs, limited applicability of traditional fully "metallic" joining solutions based on metallic welding, rivets, and bolting connections to connect composite rods directly, and relatively low structural behavior of adhesive-based complex joint geometries.

The present disclosure addresses these and similar challenges associated with joints for composite frames and provides efficient design and manufacturing solutions for practical implementation for opto-mechanical support composite frame structures.

SUMMARY

In one aspect, a joint for a composite frame includes a first composite rod, a first shell abutting the first composite rod, a second shell abutting the first composite rod and disposed opposite the first shell relative to the first composite rod. The first and second shells are joined together such that composite rod is fixed therebetween.

In another aspect, a method of forming joints of composite frame includes forming a composite frame by interconnecting a plurality of composite rods formed by an Automated Fiber Placement (AFP) manufacturing method around a mandrel, applying a first shell to the plurality of composite rods at a first location where composite rods of the plurality of composite rods are interconnected, applying a second shell to the plurality of composite rods at the first location, wherein the second shell is disposed opposite the first shell relative to the composite rods, and joining the first and second shells together with the plurality of composite rod at the first location disposed between the first and second shells.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
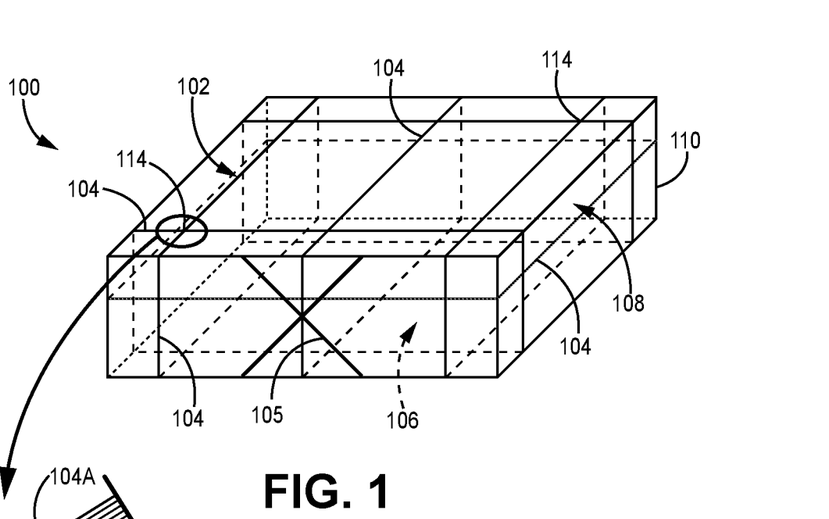
FIG. 1 is a perspective view of a composite frame constructed in accordance with the present disclosure.

FIG. 1 is a perspective view of composite frame 100 constructed in accordance with the present disclosure. FIG. 1 shows composite frame 100, including interconnected lattice 102 of continuous (i.e., closed loop) composite frame rods 104 and/or discontinuous (i.e., open loop) composite frame rods 105 defined about an interior space 106 with interstices 108 defined between frame composite rods 104, 105. FIG. 1 also shows mandrel 110 about which frame composite rods 104, 105 are formed. FIG. 1 shows the beginning of a composite frame structure, to which additional composite frame rods 104, 105 can be added as described in co-pending patent application U.S. patent application Ser. No. 17/679,489, which is incorporated by reference in its entirety.

Figure 2A:
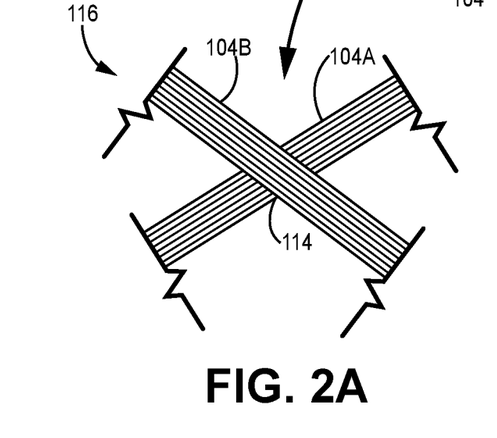
FIG. 2A is an enlarged top view of interconnected composite rods of the composite frame of FIG. 1 forming an X-type connection.

Frame composite rods 104, 105 can be unidirectional fiber-reinforced polymer-matrix composite elements formed by Automated Fiber Placement (AFP). Carbon, glass, and organic (e.g., Kevlar) fibers or any combination thereof, among other materials, can be used for reinforcement. Thermoplastics or thermoset materials can form the polymer matrix. Any combination of frame composite rods 104 and/or 105 can be interconnected at intersections 114 in lattice 102, as illustrated in FIG. 2A. Intersections 114 include interlayering of composite layers (shown, for example, in through-thickness cross-sectional view at FIG. 3D) or groups of layers of the respective intersecting frame composite rods 104, 105 formed by laying one layer (or group of layers) at a time in the intersection stack, such that layers (or groups of layers) of one frame composite rod 104, 105 are separated by layers (or groups of layers) of the intersecting frame composite rod 104, 105. Frame composite rods 104, 105 can have any desired cross-sectional shape and thickness and can be formed of any number of layers to provide sufficient structural support and load transfer. In other embodiments, non-unidirectionally reinforced layups (e.g., with +α/−α or with transversal (i.e., 90 deg) orientations or reinforced by fiber fabric) can be used in frame composite rods 104, 105 in addition or instead of unidirectionally reinforced layers.

The present disclosure provides designs and methods of manufacture of joint implementations for composite frame 100, which allow opto-mechanical equipment to be connected to composite frame 100 and allow composite frame 100 to be connected to larger structural systems or supports. Upper and lower shells having profiles matching interconnected frame composite rods 104, 105 and joined together frame composite rods 104, 105 retained therebetween can be used to provide multiple types of joints capable of effectively transferring load from opto-mechanical equipment to composite frame 100 and from composite frame 100 to other support structures.

Figure 2B:
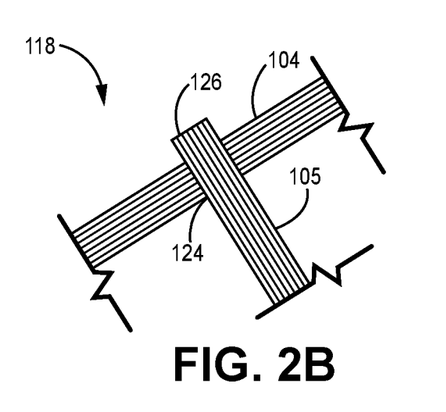
FIG. 2B is an enlarged top view of interconnected composite rods of a composite frame forming a T-type connection.
Figure 2C:
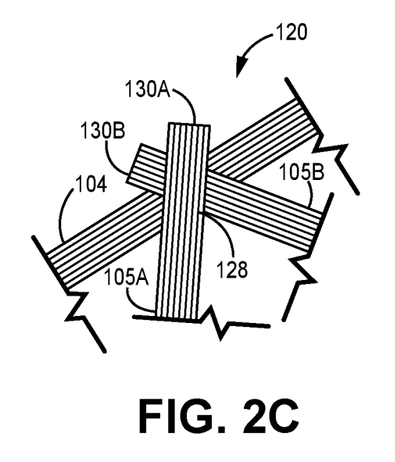
FIG. 2C is an enlarged top view of interconnected composite rods of a composite frame forming a K-type connection.
Figure 2D:
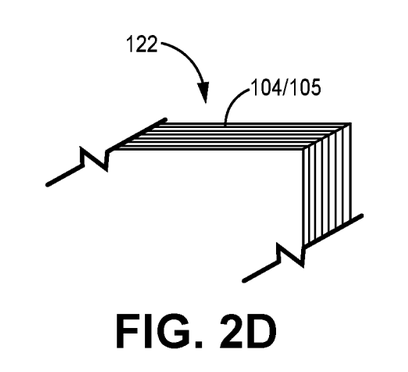
FIG. 2D is an enlarged perspective view of a composite rod forming a L-type corner of a composite frame.

Four main types of joints are disclosed, including X-type joint 116 as schematically illustrated in FIG. 2A, T-type joint 118, as schematically illustrated in FIG. 2B, K-type joint 120, as schematically illustrated in FIG. 2C, and L-type joint 122, as schematically illustrated in FIG. 2D. One of ordinary skill in the art will appreciate that variations and combinations of the disclosed joints can be used without departing from the scope of the present disclosure.

FIG. 2A shows X-type joint 116 formed from two continuous frame composite rods 104A, 104B, which interconnect at intersection 114. Interconnected frame composite rods 104A, 104B can be oriented to cross one another at intersection 114 at any relative angle. Frame composite rods 104A, 104B can be interconnected to one or more additional frame composite rods 104, 105 at different locations of composite frame 100. In some embodiments, one or both of interconnected frame composite rods 104A, 105B can be a discontinuous frame composite rod.

FIG. 2B shows T-type joint 118 formed from one continuous frame composite rod 104 and one discontinuous frame composite rod 105, which interconnect at intersection 124. Interconnected frame composite rods 104, 105 can be oriented to cross one another at intersection 124 at any relative angle and are not limited to embodiments presenting as a T-shape. Composite discontinuous rod 105 is shown in FIG. 2B as perpendicular to composite rod 104 as a representative demonstration. Other, non-perpendicular orientations can be similarly covered in other T-type embodiments. Discontinuous frame composite rod 105 has a terminal end 126 that extends beyond intersection 124 and continuous frame rod 104. Discontinuous frame composite rod 105 can be a discontinuous loop, which can extend a partial perimeter of composite frame 100, or a segment thereof. Both continuous frame composite rod 104 and discontinuous frame composite rod 105 can be interconnected to one or more frame composite rods 104, 105.

FIG. 2C shows K-type joint 120 formed from one continuous frame composite rod 104 and two or more discontinuous frame composite rods 105A, 105B, which interconnect at intersection 128. Interconnected frame composite rods 104, 105A, 105B can be oriented to cross one another at intersection 128 at any relative angles. Each discontinuous frame composite rod 105A, 105B has a terminal end 130A, 130B that extends beyond intersection 128 and continuous frame rod 104. As illustrated in FIG. 2C, terminal ends 130A, 130B can be located on the same side of continuous frame composite rod 104. Each discontinuous frame composite rod 105A, 105B can be a discontinuous loop, which can extend a partial perimeter of composite frame 100, or a segment thereof. Both continuous frame composite rod 104 and discontinuous frame composite rods 105A, 105B can be interconnected to one or more frame composite rods 104, 105. In some embodiments, K-type joint 120 includes more than two discontinuous frame composite rods 105. In other embodiments, terminal ends 130A, 130B of interconnected discontinuous frame composite rods 105A, 105B can be located on opposite sides of continuous frame composite rod 104. Two composite discontinuous rods 105A and 105B are shown in FIG. 2C as a representative demonstration. Other designs with more than two discontinuous rods can be similarly covered in other K-type embodiments.

FIG. 2D shows L-type joint 122 formed from a single frame composite rod 104, 105 at a corner of composite frame 100. Unlike X-, T-, and K-type joints which are in-plane, L-type joint is formed at a corner intersection of a single frame composite rod 104 or 105. Frame composite rod 104/105 is bent in a widthwise direction to form a corner of composite frame 100. L-type joint 122 can be formed from a continuous frame composite rod 104 or discontinuous frame composite rod 105. Composite rod 104, 105 is shown in FIG. 2D as having a perpendicular orientation as a representative demonstration. Other, non-perpendicular orientations can be similarly covered in other L-type embodiments.

Figure 3A:
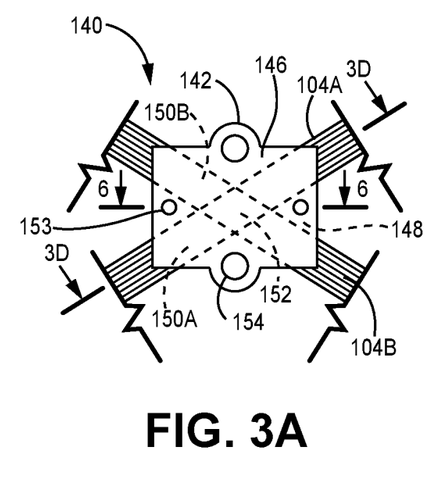
FIG. 3A is a top view of a X-type joint for the interconnected composite rods of FIG. 2A shown with an upper shell.
Figure 3B:
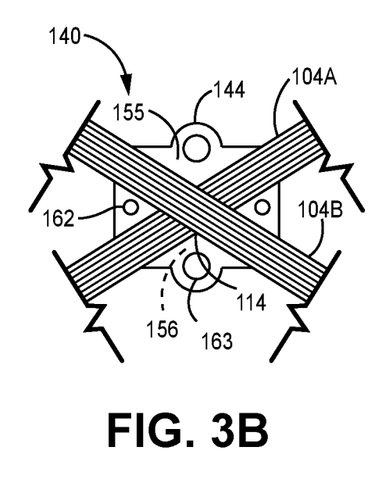
FIG. 3B is a mid-plane view of the joint of FIG. 3A shown without the upper shell and with a lower shell.
Figure 3C:
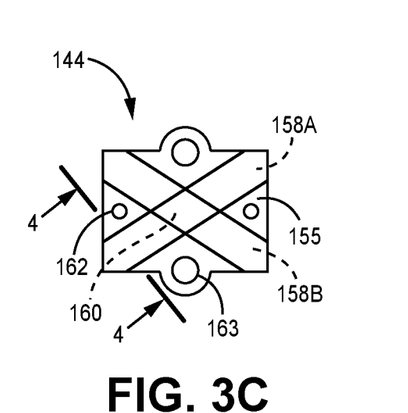
FIG. 3C is a top view of an inner surface of the upper or lower shells of FIG. 3B.
Figure 3D:
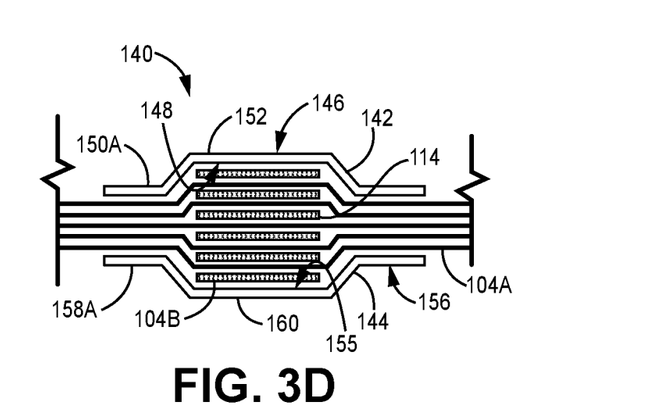
FIG. 3D is a cross-sectional view of the joint of FIG. 3A taken along the 3D-3D line.

FIGS. 3A-3D are views of joint implementation 140 for interconnected frame composite rods 104A, 104B forming an X-type joint as illustrated in FIG. 2A. FIG. 3A is a top view of joint 140 showing continuous frame composite rods 104A, 104B and upper shell 142. FIG. 3B is a mid-plane view of joint 140 of FIG. 3A with upper shell 142 removed and showing lower shell 144. FIG. 3C is a top view of an inner surface of lower shell 144 of FIG. 3B. FIG. 3D is a cross-sectional view of joint 140 of FIG. 3A taken along the 3D-3D line and showing both upper shell 142 and lower shell 144 and interconnected continuous frame composite rods 104. FIGS. 3A-3D are described together. In other embodiments, one or both of frame composite rods 104A, 104B can be a discontinuous frame composite rod.

Upper and lower shells 142, 144 can be used to provide multiple types of joints capable of effectively transferring load from opto-mechanical equipment to composite frame 100 and from composite frame 100 to other support structures. FIG. 3A shows upper shell 142, having outer surface 146, inner surface 148, including grooves 150A, 150B and depression 152 (shown in phantom), optional fasteners 153, and optional holes 154. FIG. 3B shows joint 140 with upper shell 142 removed. FIG. 3B shows frame composite rods 104A, 104B and lower shell 144 having inner surface 155 and outer surface 156. FIG. 3C shows inner surface 155 of lower shell 144, including grooves 158A, 158B and depression 160, optional holes 162 configured to receive fasteners 153, and holes 163. Upper shell 142 and lower shell 144 can be substantially the same and arranged with inner surfaces 148 and 155 facing each other and alignment of holes 154, 163, optional fasteners 153 and holes 162, grooves 150A, 150B and 158A, 158B, and depressions 152 and 160. In some embodiments, fasteners 153 can be provided to join upper and lower shells 142, 144. Holes 154 and 163 can be used to secure opto-mechanical equipment to composite frame 100 or to secure composite frame 100 to a larger structural support system. As illustrated in FIG. 3D upper and lower shells 142, 144 can have a substantially uniform thickness such that outer surfaces 146 and 156 have protrusions corresponding to grooves 150A, 150B, 158A, 158B and depressions 152 and 160. In other embodiments, upper and lower shells 142, 144 can have non-uniform thicknesses, defined according to consideration of structural performance. Non-uniformity of shell thickness can be implemented, for example, by different number of layers in case of composite shells or, for example, by machining in case of metallic shells.

Upper shell 142 is disposed to abut frame composite rods 104A, 104B in a region including intersection 114 and an area surrounding intersection 114 including portions of frame composite rods 104A, 104B extending from intersection 114. Upper shell 142 can be disposed on an outward-facing surface of frame composite rods 104A, 104B. Frame composite rods 104A, 104B extend beyond upper shell 142 (and lower shell 144). Grooves 150A, 150B can be formed in inner surface 148 to accommodate frame composite rods 104A, 104B. As illustrated in FIG. 3A, grooves 150A, 150B are aligned with frame composite rods 104A, 104B and extend to the edges of upper shell 142. Each groove 150A, 150B can have a profile substantially matching a profile of a respective frame composite rod 104A, 104B, such that a single frame composite rod 104 substantially fills a space formed by groove 150 to minimize or eliminate gaps between upper shell 142 and frame composite rods 104A, 104B and thereby constrain movement of upper shell 142 relative to frame composite rods 104A, 104B with applied load.

Depression 152 is located at intersection 114 to accommodate both frame composite rods 104A and 104B at the location of interconnection. Depression 152 can have a profile substantially matching a profile of interconnected frame composite rods 104A, 104B at intersection 114 such that interconnected frame composite rods 104A, 104B substantially fill a space formed by depression 152. As illustrated in FIG. 3D, depression 152 has a depth that is greater than a depth of grooves 150A, 150B to accommodate both frame composite rods 104A and 104B at intersection 114.

Lower shell 144 is disposed to abut frame composite rods 104A, 104B opposite upper shell 142, such that frame composite rods 104A, 104B are disposed between upper and lower shells 142, 144. Lower shell 144 can be disposed on an opposite, inward-facing, surface of frame composite rods 104A, 104B. Lower shell 144 is disposed in the region including intersection 114 and area surrounding intersection 114 including portions of frame composite rods 104A, 104B extending from intersection 114. A perimeter of lower shell 144 can substantially match a perimeter of upper shell 142 such that edges of upper shell 142 and lower shell 144 are aligned. Grooves 158A, 158B can be formed in inner surface 155 to accommodate frame composite rods 104A, 104B. Grooves 158A, 158B are aligned with frame composite rods 104A, 104B and extend to edges of lower shell 144. Each groove 158A, 158B can have a profile substantially matching a profile of a respective frame composite rod 104A, 104B, as described with respect to upper shell 142. Depression 160 is located at intersection 114 to accommodate both frame composite rods 104A and 104B at the location of interconnection. Depression 160 can have a profile substantially matching a profile of interconnected frame composite rods 104A, 104B at intersection 114, as described with respect to upper shell 142.

In some embodiments, grooves 150A, 150B and depression 152 of upper shell 142 are mirror images of grooves 158A, 158B and depression 160 of lower shell 144, respectively, with grooves 150A, 150B and depression 152 accommodating an upper half of frame composite rods 104A, 104B and grooves 158A, 158B and 160 accommodating a lower half of frame composite rods 104A, 104B. In other embodiments, the depth and/or cross-sectional profile of grooves 150A, 150B and depression 152 can differ from the depth and/or cross-sectional profile of grooves 158A, 158B and depression 160, depending on the construction of frame composite rods 104. In some embodiments, interconnected frame composite rods 104A, 104B can vary in cross-sectional profile or thickness such that grooves 150A and 150B on upper shell 142 have different depths and/or cross-sectional profiles and grooves 158A and 158B on lower shell 144 have different depths and/or cross-sectional profiles.

In some embodiments, grooves and/or depressions in upper and lower shells can loosely correlate with a profile of frame composite rods. In some embodiments, grooves and/or depressions can be absent from upper and lower shells (i.e., inner surfaces of upper and lower shells can be substantially flat) or can be formed during assembly of upper and lower shells. For example, in some embodiments, grooves and/or depressions can be formed in upper and lower shells as pressure is applied to upper and lower shells and frame composite rods in the joining process.

Figure 4A:
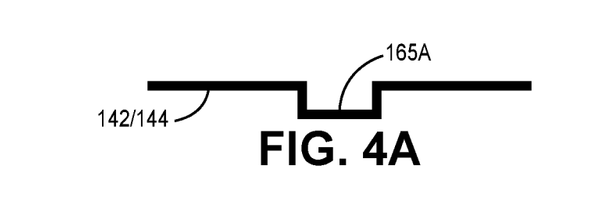
FIGS. 4A-4C are cross-sectional profiles of the upper or lower shells, showing variants of grooves, taken, for example, along the 4-4 line of FIG. 3C.
Figure 4B:
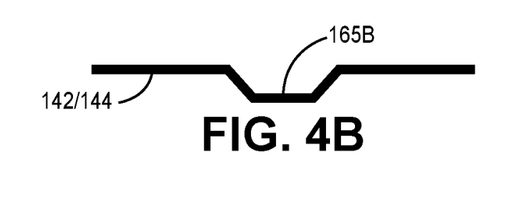
Figure 4C:
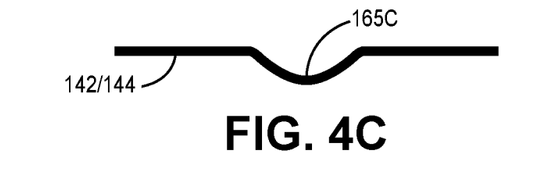

FIGS. 4A-4C are representative through-thickness cross-sectional profiles of variants of grooves 150A, 150B and 158A, 158B of upper or lower shells 142, 144 taken, for example, along the 4-4 line of FIG. 3C pertaining to groove 158A. The cross-sectional profiles of grooves 150A, 150B and 158A, 158B can be designed to accommodate variations in cross-sectional profiles of frame composite rods 104A, 104B, or in alternative embodiments, any single or combination of continuous frame rods 104 or discontinuous frame rods 105. FIG. 4A illustrates a rectangular groove 165A; FIG. 4B illustrates a trapezoidal groove 165B; FIG. 4C illustrates a curved groove 165C. As previously discussed, grooves 150A, 150B, 158A, 158B can have uniform cross-sectional profiles or cross-sectional profiles that differ in shape or size depending on the construction of frame composite rods 104A, 104B. It will be understood by one of ordinary skill in the art that the cross-sectional profiles of grooves illustrated in FIGS. 4A-4C and variations thereof can be incorporated into any of the embodiments described herein.

Figure 5A:
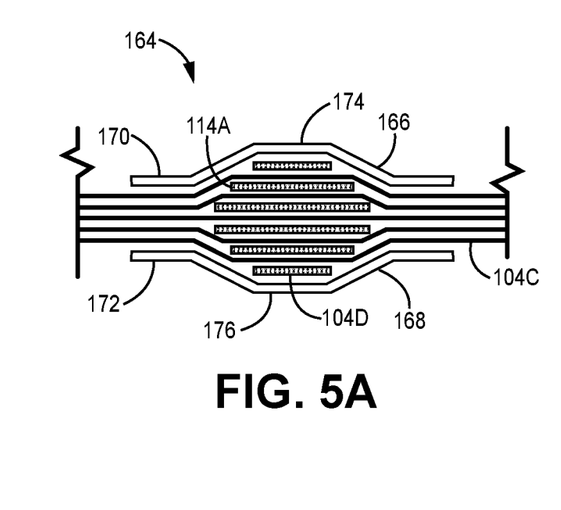
FIGS. 5A and 5B are cross-sectional views of embodiments of the coupling of upper and lower shells and frame composite rods taken along the 6-6 line of FIG. 3A.
Figure 5B:
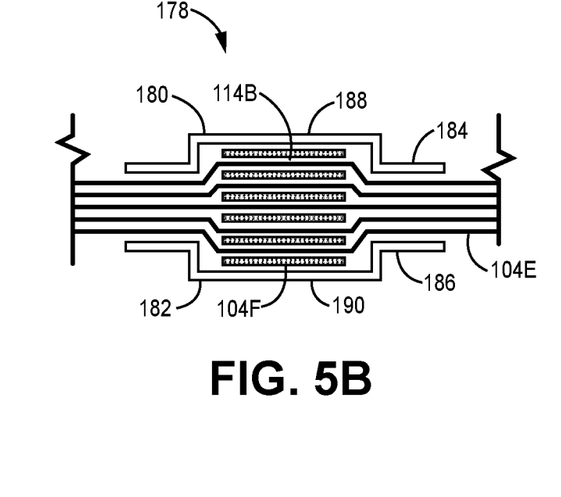

FIGS. 5A and 5B are cross-sectional views of geometrical variants of upper and lower shells 142, 144 and frame composite rod construction. FIGS. 5A and 5B are variants of the embodiment shown in FIG. 3D. FIG. 5A shows joint 164 having upper shell 166, lower shell 168, frame composite rods 104C, 104D, grooves 170, 172 accommodating frame composite rods 104C, and depressions 174, 176 accommodating frame composite rods 104C, 104D at intersection 114A. FIG. 5B shows joint 178 having upper shell 180, lower shell 182, frame composite rods 104E, 104F, grooves 184, 186 accommodating frame composite rods 104E, and depressions 188, 190 accommodating frame composite rods 104E, 104F at intersection 114B.

As illustrated, the shapes of depressions of upper and lower shells differ based on the construction of frame composite rods. Depressions 174, 176 of upper and lower shells 166, 168 have a tapered shape designed to accommodate frame composite rod 104D having a tapered cross-sectional profile with outermost composite layers having a narrower width than central composite layers. One or more composite layers of frame composite rod 104D are separated by one or more composite layers of frame composite rods 104C. Depressions 174 and 176 are designed to substantially conform to the profile of frame composite rods 104C, 104D at intersection 114A. For example, as illustrated, portions of outermost composite layers of frame composite rods 104C can be disposed adjacent to and generally conform to profile of an angled portion of depressions 174, 176 and outermost composite layers of frame composite rods 104C can be disposed adjacent to and generally conform to a profile of a flat portion of depressions 174, 176. In contrast, depressions 188, 190 of upper and lower shells 178, 180 have a rectangular cross-sectional profile to accommodate frame composite rod 104F having a rectangular cross-sectional profile with composite layers of uniform width. It will be understood by one of ordinary skill in the art that the cross-sectional profiles of the depressions disclosed in FIGS. 3D, 5A, and 5B and variations thereof can be incorporated into other embodiments disclosed herein.

Figure 6:
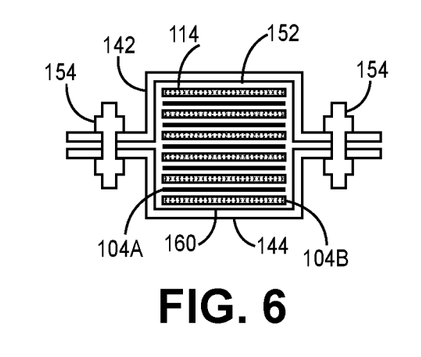
FIG. 6 is a cross-sectional view of one embodiment of the coupling of the upper and lower shells taken along the 6-6 line of FIG. 3A.

Upper and lower shells of any of the disclosed embodiments or variations thereof are fixedly joined together. FIG. 6 is a cross-sectional view of one embodiment of the coupling of upper and lower shells 142, 144 taken along the 6-6 line of FIG. 3A. FIG. 6 shows upper and lower shells 142, 144, frame composite rods 104A, 104B at intersection 114, depressions 152, 160 and fasteners 154. In the illustrated embodiment, upper and lower shells 142, 144 can be formed of metal and joined together by fasteners 154. Fasteners 154 can be bolts, rivets, screws, or other coupling mechanism capable of securing upper and lower shells 142 and 144 together. As illustrated, two fasteners 154 can be provided along oppositely disposed edges of upper and lower shells 142, 144 between frame composite rods 104A and 104B. Additional fasteners can be provided as needed. In some embodiments, upper and lower shells 142, 144 can include bushings (not shown) through which fasteners are received. Similarly, in some embodiments, holes 156 of upper and lower shells 142, 144 can include bushings for attachment of opto-mechanical equipment or coupling to a structural support.

As discussed further herein, in alternative embodiments, upper and lower shells can be formed of a thermoset or thermoplastic polymer material. These shells can be reinforced by different types of fibers, e.g., by carbon, glass, organic (e.g., Kevlar) fibers or any of their combinations. The reinforcements can be implemented by different layups, for example, by laminated designs based on unidirectionally reinforced or fabric layers. In other embodiments, the reinforcement can be implemented by short (chopped) fibers distributed in the polymer matrix. Fasteners 154 can be either eliminated or still used in such composite embodiments of upper and lower shells. Upper and lower shells formed of a thermoplastic polymeric matrix can be connected and mutually fixed by welding and/or co-consolidation. Upper and lower shells formed of a thermoset polymeric matrix can be connected and mutually fixed by adhesion and/or co-curing. For example, an adhesive can be applied to inner surfaces of upper and lower shells to join upper and lower shells to each other and to frame composite rods 104A, 104B.

Figure 7A:
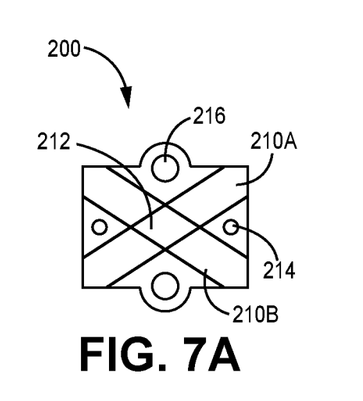
FIGS. 7A-7E are top views of geometrical variants of upper and/or lower shells.
Figure 7B:
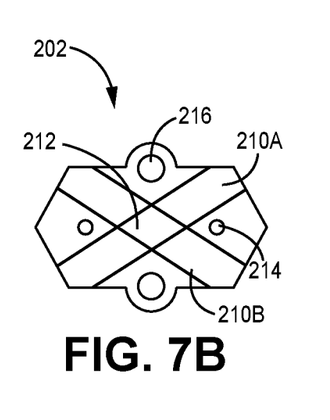
Figure 7C:
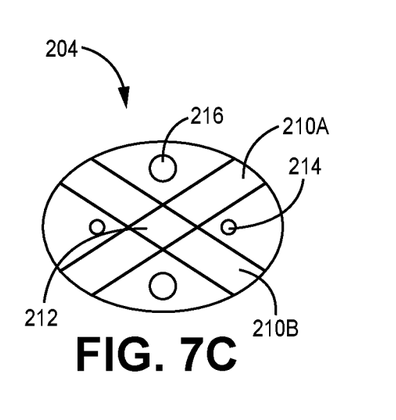
Figure 7D:
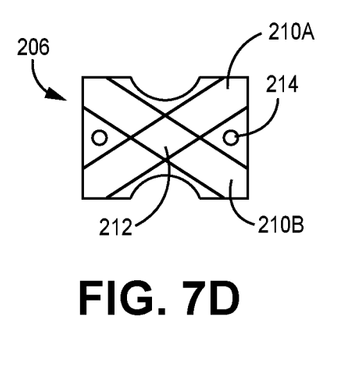
Figure 7E:
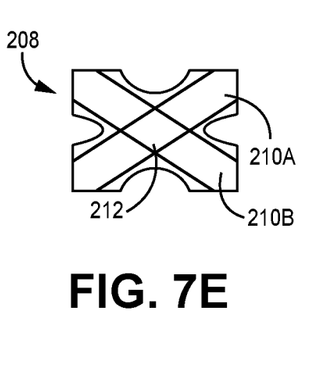

FIGS. 7A-7E are top views of geometrical variants of upper and lower shells (e.g., rectangular, polygonal, curved or ellipsoidal, partially concave, and fully concave or star-type). FIGS. 7A-7E show inner surfaces of upper/lower shells 200, 202, 204, 206, 208. Each upper/lower shell can include grooves 210A, 210B and depression 212. Optional holes 214 for fastening upper and lower shells together are provided in all but upper/lower shell 208 (FIG. 7E). Holes 216 are provided in upper/lower shells 200, 202, 204 for connecting opto-mechanical components to composite frame 100 or securing composite frame 100 to a structural support. FIGS. 7A-7E are provided to illustrate examples of upper/lower shells capable of effectively transferring load from opto-mechanical equipment to composite frame 100 and from composite frame 100 to other support structures. Generally, selection of upper/lower shells can be made to provide structural stability while minimizing material weight. It will be understood that other geometrical variants of upper/lower shells fall within the scope of the invention. It will be understood by one of ordinary skill in the art that the geometrical shapes of upper and lower shells illustrated in FIGS. 7A-7E and variations thereof can be adapted for use in alternative joint embodiments disclosed herein, including those having one or more discontinuous grooves for accommodating one or more discontinuous frame composite rods 105.

Figure 8A:
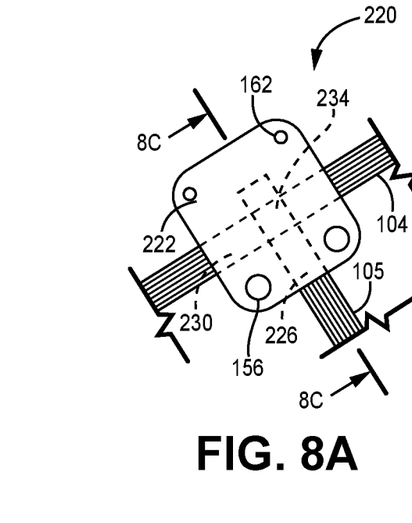
FIG. 8A is a top view of a joint for the T-type connection of FIG. 2B show with an upper shell.
Figure 8B:
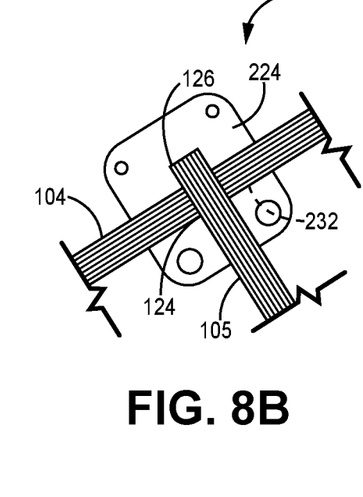
FIG. 8B is a mid-plane view of the joint of FIG. 8A shown without the upper shell and with a lower shell.
Figure 8C:
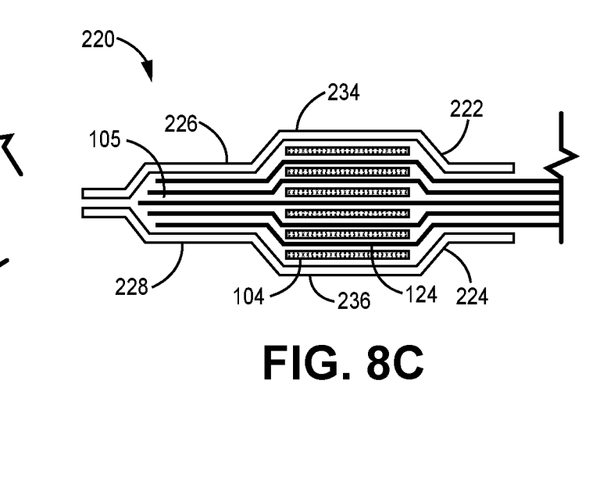
FIG. 8C is a cross-sectional view of the joint of FIG. 8A taken along the 8C-8C line.
Figure 8D:
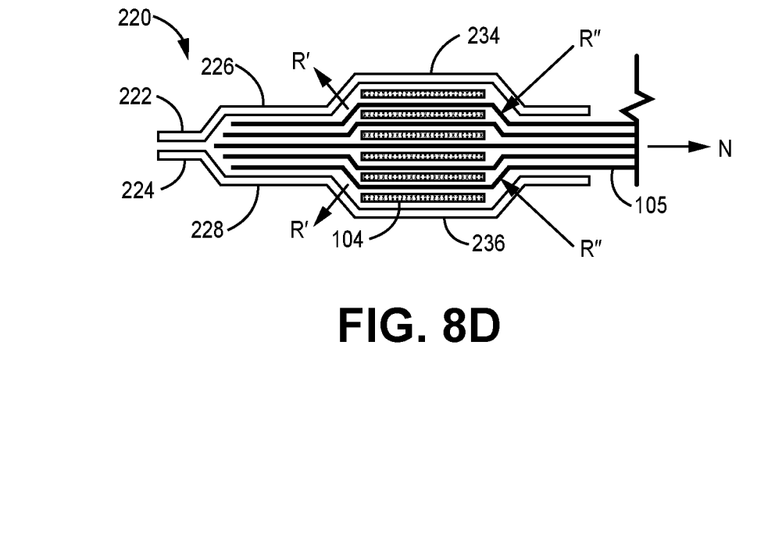
FIG. 8D shows a scheme of local load transfer of the joint of FIG. 8C along the 8C-8C line under tension in a discontinuous composite rod.
Figure 8E:
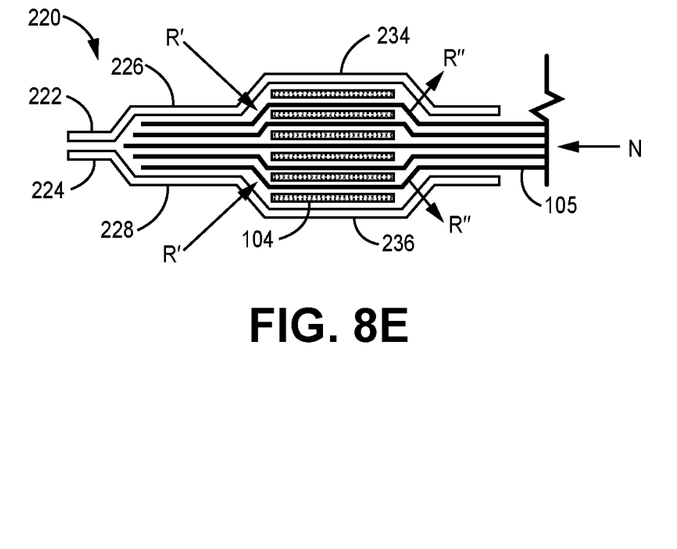
FIG. 8E shows a scheme of local load transfer of the joint of FIG. 8C along the 8C-8C line under compression in the discontinuous composite rod.

FIGS. 8A-8E are views of joint implementation 220 for interconnected frame composite rods 104, 105 forming a T-type joint as illustrated in FIG. 2B. FIG. 8A is a top view of joint 220 showing continuous frame composite rod 104, discontinuous frame composite rod 105, and upper shell 222. FIG. 8B is a mid-plane view of joint 220 with the upper shell 222 removed and showing lower shell 224. FIG. 8C is a cross-sectional view of joint 220 taken along the 8C-8C line of FIG. 8A. FIG. 8D shows a scheme of load transfer of the joint of FIG. 8C under tension N in discontinuous composite rod 105. Similarly, FIG. 8E shows a scheme of load transfer of the joint of FIG. 8C under compression N in discontinuous composite rod 105. Arrows R' and R" represent simplified directions and magnitudes of corresponding main reactions in the joint to guarantee an equilibrium of forces under applied load. FIGS. 8A-8E are described together.

Upper and lower shells 222, 224, continuous frame composite rod 104, discontinuous frame composite rod 105 with terminal end 126, optional holes 162 for fasteners, and holes 156 for connecting opto-mechanical equipment to frame 100 or connecting frame 100 to a structural support, discontinuous grooves 226, 228, continuous grooves 230, 232 (shown in FIG. 8A under frame composite rod 104), and depressions 234, 236 are shown. Upper and lower shells 222, 224 of joint 220 are substantially similar to upper and lower shells 142, 144 described with respect to FIGS. 3A-3D with the exception that upper and lower shells 222, 224 include discontinuous grooves 226, 228 to accommodate terminal end 126 of discontinuous frame composite rod 105. As illustrated, discontinuous grooves 226, 228 extend beyond depressions 230, 232 but do not extend to an edge of upper and lower shells 222, 224. One or more composite layers of discontinuous frame composite rod 105 are separated by one or more composite layers of continuous frame composite rod 104 at intersection 124. Discontinuous frame composite rod 105 extends beyond intersection 124 and is retained in discontinuous grooves 226, 228. Upper and lower shells 222, 224 are joined via fasteners (for metallic or thermoplastic or thermoset shells), welding or/and co-consolidation (thermoplastic shells), adhesive or/and co-curing (thermoset shells), as previously described depending on the materials of upper and lower shells 222, 224. Upper and lower shells 222, 224 are joined around terminal end 126 of discontinuous frame composite rod 105. In some embodiments, upper and lower shells 222, 224 are similarly fixed to discontinuous frame composite rod, e.g., via adhesive, co-curing, and/or consolidation. In some embodiments, terminal end 126 can extend beyond an outer edge of upper and lower shells 222, 224. In such embodiments, grooves 226, 228 can be continuous or extending to the edge of upper and lower shells 222, 224 to accommodate the extended length of discontinuous frame composite rod 105.

The tapered (or approximately tapered) shapes of depressions 234, 236 of upper and lower shells 222, 224 can be designed to efficiently transfer and balance load (e.g., tension or compression) applied to discontinuous frame rod 105. For example, load N applied to discontinuous frame composite rod 105 can be mainly balanced by reactions R' and R" at sloped portions of depressions 234, 236 of upper and lower shells 222, 224.

Figure 9A:
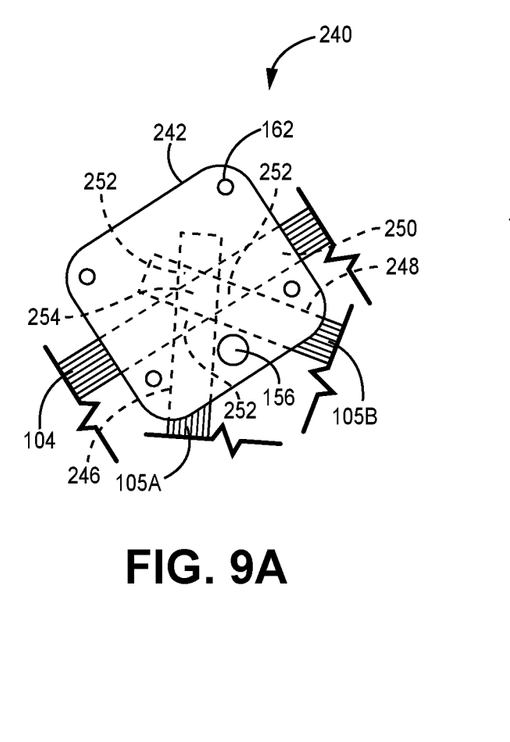
FIG. 9A is a top view of a joint for the K-type connection of FIG. 2C shown with an upper shell.
Figure 9B:
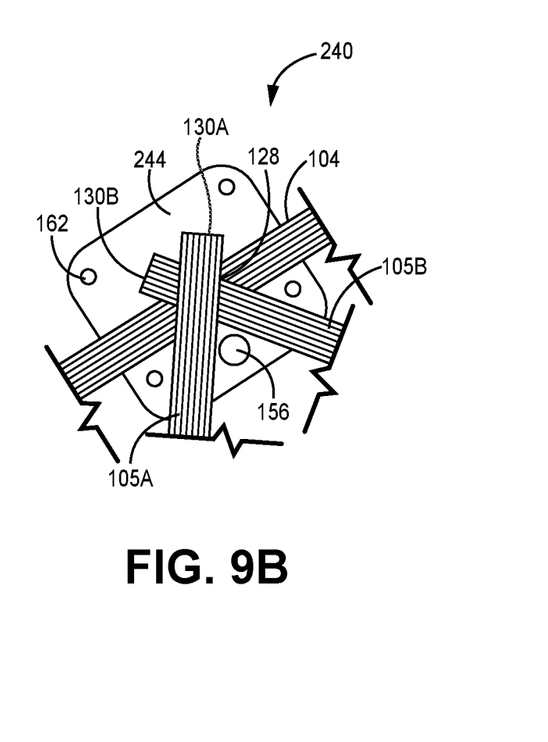
FIG. 9B is a mid-plane view of the joint of FIG. 9A shown without the upper shell and with a lower shell.

FIGS. 9A and 9B are views of joint implementation 240 for interconnected frame composite rods 104, 105A, 105B forming K-type joint as illustrated in FIG. 2C. FIG. 9A is a top view of joint 240 showing continuous frame composite rod 104, discontinuous frame composite rods 105A, 105B, and upper shell 242. FIG. 9B is a mid-plane view of joint 240 with upper shell 242 removed and showing lower shell 244. FIGS. 9A and 9B are discussed together.

Upper and lower shells 242, 244, continuous frame composite rod 104, discontinuous frame composite rods 105A, 105B with terminal ends 130A, 130B, optional holes 162 for fasteners, and hole 156 for connecting opto-mechanical equipment to frame 100 or connecting frame 100 to a structural support, discontinuous grooves 246, 248 continuous groove 250, and depressions 252, 254 are shown. Upper and lower shells 242, 244 of joint 240 are substantially similar to upper and lower shells 222, 224 described with respect to FIGS. 8A-8E with the exception that upper and lower shells 242, 244 include multiple discontinuous grooves 246, 248 to accommodate terminal ends 130A, 130B of discontinuous frame composite rods 105A, 105B and include depressions 252, 254 of varying depth in a single upper/lower shell 242, 244 to accommodate differing interconnections of frame composite rods 104, 105A, and 105B at intersection 128. Further, upper and lower shells 242, 244 include four optional holes 162 for fastening upper and lower shells 242, 244 together and a single hole 156 for connecting opto-mechanical equipment to composite frame 100 or to connect composite frame 100 to a structural support system. As previously discussed, the number and location of holes 162 and 156 can be varied without departing from the scope of the present disclosure and in some embodiments, holes for fasteners can be eliminated.

As described with respect to FIGS. 8A-8E, discontinuous grooves 246, 248 extend beyond depressions 252, 254 but do not extend to an edge of upper or lower shells 242, 244. Depressions 252 are configured to accommodate the interconnection of continuous frame composite rod 104 and one of discontinuous frame composite rods 105A or 105B. Depression 254 is centrally located and configured to accommodate the interconnection of all frame composite rods 104, 105A, and 105B. As such, depression 254 can have a depth greater than a depth of depressions 252. In some embodiments, terminal ends 130A, 130B can extend beyond and outer edge of upper and lower shells 242, 244. In such embodiments, grooves 246, 248 can be continuous or extending to the edge of upper and lower shells 242, 244 to accommodate the extended length of discontinuous frame composite rods 105A, 105B.

Figure 10A:
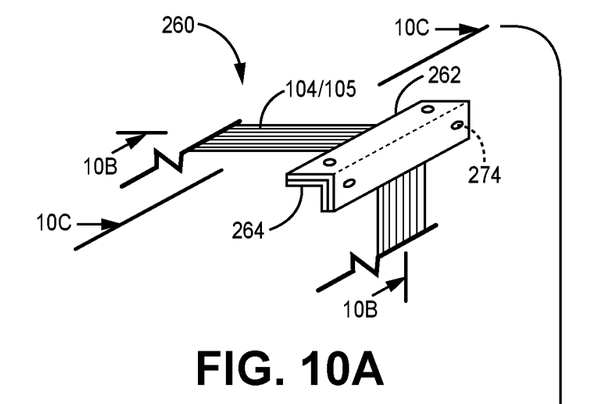
FIG. 10A is a perspective view of a L-type joint for a corner of the composite frame as shown in FIG. 2D.
Figure 10B:
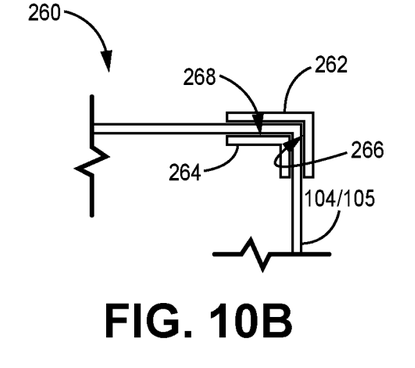
FIG. 10B is a cross-sectional view of the joint of FIG. 10A taken along the 10B-10B line.
Figure 10C:
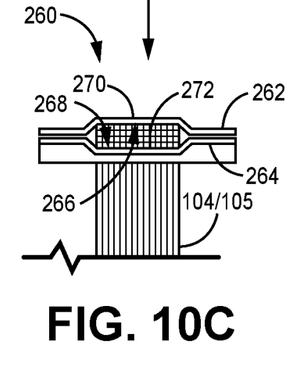
FIG. 10C is a cross-sectional view of the joint of FIG. 10B taken along the 10C-10C line

FIGS. 10A-10C are views of joint implementation 260 formed on a corner of composite frame 100. FIG. 10A is a perspective view of joint 260 for continuous frame composite rod 104 at a corner of composite frame 100 as shown in FIG. 2D. FIG. 10B is a cross-sectional view of joint 260 taken along the 10B-10B line of FIG. 10A. FIG. 10C is a cross-sectional view of joint 260 taken along the 10C-10C line of FIG. 10B. FIGS. 10A-10C are described together.

FIGS. 10A-10C show continuous frame composite rod 104, upper and lower shells 262, 264 having inner surfaces 266, 268 and grooves 270, 272, respectively, and holes 274. Upper and lower shells 262, 264 are applied to a single frame composite rod 104 at a corner. Upper shell 262 is applied to an outward-facing surface of frame composite rod 104. Lower shell 264 is nested in upper shell 262 and applied to an opposite, inward-facing, surface of frame composite rod 104. Frame composite rod 104 can be received and retained in grooves 270, 272. Grooves 270, 272 can be configured to substantially conform to a profile of frame composite rod 104. Upper and lower shells can be joined together as described with respect to respect to joint 140 shown in FIGS. 3A-3D (e.g., via fasteners (for metallic or thermoplastic or thermoset shells), welding or/and co-consolidation (for thermoplastic shells), adhesive and/or co-curing (for thermoset shells)). Opto-mechanical equipment can be connected to composite frame 100 via joint 260 and/or composite frame can be connected to a structural support system via joint 260 as previously described.

Upper and lower shells disclosed herein and variations thereof can be formed by a variety of methods known in the art. Upper and lower shells can be formed, for example, by molding a composite material. Upper and lower shells can be formed from any of a variety of materials including thermoset or thermoplastic materials, which may or may not include fiber-reinforcement. A flat layup of a composite shell can be pressed between upper and lower molds to create a desired profile including grooves and depressions configured to accommodate frame composite rods of similar profiles. Optional finishing steps and/or surface coatings can subsequently be applied. In alternative embodiments, upper and lower shells can be metallic and formed, for example, by pressing or machining. A flat metallic sheet can be cut to a desired size and shape of an upper or lower shell and pressed between upper and lower forms to create a desired profile, which can include grooves and depressions configured to accommodate frame composite rods of similar profiles. Alternatively, a butt metallic piece can be machined to create the desired groove and depression profiles. Additional finishing steps and/or coatings (e.g., anti-corrosion) can be applied to upper and lower shells. Composite upper and lower shells can be designed to effectively transfer load with reduced weight in comparison to metallic shells. In some embodiments, materials of metallic shells can be selected to match a thermal expansion coefficient of an attached structural component to reduce thermal expansion mismatch as may be beneficial in some applications.

Figure 11:
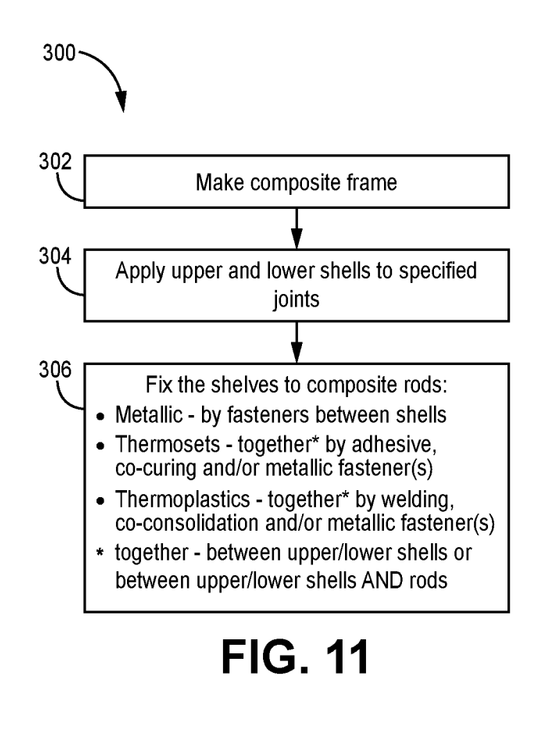
FIG. 11 is a flowchart of method of forming a joint of a composite frame.

FIG. 11 shows method 300 of forming a joint of a composite frame. Composite frame 100 can be made in step 302 by AFP as previously described and disclosed in co-pending patent application U.S. patent application Ser. No. 17/679,489. In step 304, upper and lower shells can be applied to specified joints (e.g., X-type, T-type, K-type, or L-type joints described herein) after the mandrel has been removed. As previously described, an upper shell can be disposed on an outward-facing surface of the frame composite rod(s) and a lower shell can be disposed on an opposite, inward-facing, surface of the frame composite rod(s) such that the frame composite rod(s) is retained therebetween. Frame composite rods can be aligned with grooves and depressions in upper and lower shells and received therein. In step 306, upper and lower shells are joined together and to frame composite rod(s). Fasteners, such as bolts, screws, rivets, and the like can be used to join metallic upper and lower shells as previously described. Composite upper and lower shells formed from thermoset materials can be co-cured together (i.e., between upper and lower shells or between upper and lower shells and frame composite rods) and/or connected with an adhesive applied to inner surfaces of upper and lower shells and/or outer surfaces of frame composite rods. In some embodiments, thermoset upper and lower shells can be partially cured during a molding process and fully cured during joining process of step 306. Composite upper and lower shells formed from thermoplastic materials can be joined by welding or consolidation together (i.e., between upper and lower shells or between upper and lower shells and frame composite rods). In some embodiments, inner surfaces of upper and lower shells can be substantially flat prior to assembly with frame composite rods and grooves and/or depressions can be formed during the joining process (e.g., during molding or consolidation).

Figure 12:
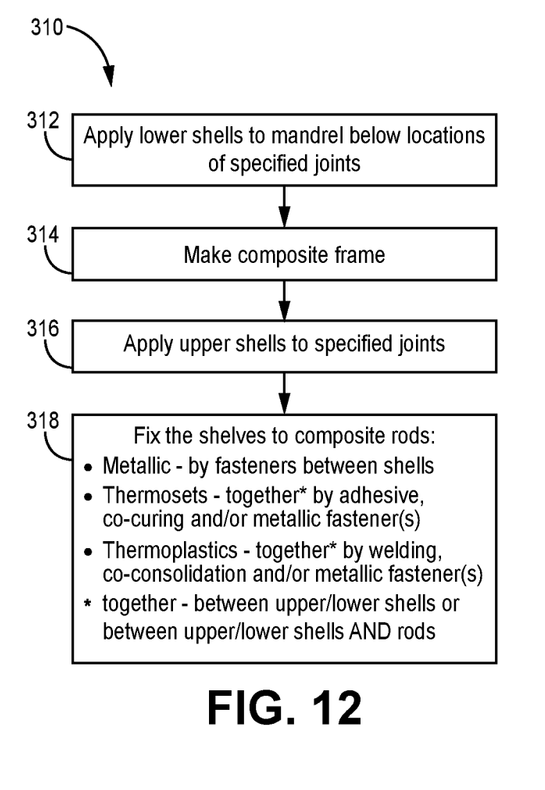
FIG. 12 is flowchart of another method of forming a joint of a composite frame.

FIG. 12 shows alternative method 310 of forming a joint of a composite frame. In method 310, lower shells are applied to a mandrel in step 312 prior to composite frame manufacture. Lower shells can be joined to a mandrel below a location of specified joints. Lower shells can have desired groove/depression profiles. The mandrel can have a surface profile designed to seat inner surfaces of grooves on the lower shell flush with an outer mandrel surface to allow composite layers of frame composite rods to be applied substantially flat along the mandrel and lower shell. Frame composite rods are disposed in the lower shell during manufacture of the composite frame in step 314. The mandrel can be removed upon completion of the composite frame and upper shells can be applied on an outward-facing surface of frame composite rods opposite the lower shell at specified joints in step 316. Grooves and depressions of upper shells can be aligned with grooves and depressions of lower shells as previously described and with the frame composite rods such that the frame composite rods are retained in the grooves and depressions between the upper and lower shells. In other embodiments, inner surfaces of upper and lower shells can be substantially flat prior to assembly with composite frame rods. In step 318, upper and lower shells are joined together as described with respect to step 306 of method 300.

The joint implementations for composite frames disclosed herein can be used to provide multiple types of joints capable of effectively transferring load from opto-mechanical equipment to a composite frame and from the composite frame to other support structures. The disclosed joint implementations overcome many of the challenges that have limited successful composite frame utilization for opto-mechanical equipment.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation. Specifically, it should be understood that profiles of grooves and depressions formed in upper and lower shells match profiles of frame composite rods within manufacturing limits, which can vary depending on the material of the upper and lower shells and method of manufacture.

Discussion of Possible Embodiments

The following are non-exclusive descriptions of possible embodiments of the present invention.

A joint for a composite frame includes a first composite rod, a first shell abutting the first composite rod, a second shell abutting the first composite rod and disposed opposite the first shell relative to the first composite rod. The first and second shells are joined together such that composite rod is fixed therebetween.

The joint of the preceding paragraph can optionally include, additionally and/or alternatively, any one or more of the following features, configurations and/or additional components:

The joint of any of the preceding paragraphs, wherein the first composite rod has a bended L-shape form, and each of the first and second shells has L-shapes with the first shell nested in the second shell to form a corner joint of the composite frame.

The joint of any of the preceding paragraphs, wherein the first shell includes a first groove configured to accommodate the first composite rod and wherein the second shell includes a second grove to accommodate the first composite rod.

The joint of any of the preceding paragraphs, and further including a second composite rod, wherein the first and second composite rods are interconnected at a first location and wherein the first and second shells are joined together such that the first and second composite rods are fixed therebetween at the first location.

The joint of any of the preceding paragraphs, wherein each of the first and second shells further includes a first groove configured to accommodate the first composite rod and a second groove configured to accommodate the second composite rod.

The joint of any of the preceding paragraphs, wherein each of the first and second composite rods is a continuous composite rod extending beyond the first and second shells.

The joint of any of the preceding paragraphs, wherein the first composite rod is a continuous composite rod, and the second composite rod is a discontinuous composite rod having a terminal end disposed between the first and second shells or beyond the first and second shells.

The joint of any of the preceding paragraphs, and further including a third composite rod, wherein the third composite rod is a continuous composite rod or a discontinuous composite rod having a terminal end disposed between the first and second shells or beyond the first and second shells. The third composite rod, first composite rod, and second composite rod are interconnected at the first location.

The joint of any of the preceding paragraphs, wherein each of the first and second shells includes a first groove configured to accommodate the first composite rod, a second groove configured to accommodate the second composite rod, and a third groove configured to accommodate the third composite rod.

The joint of any of the preceding paragraphs, wherein each of the first and second composite rods comprise layers of a fiber-reinforced polymer-matrix composite material, and wherein layers of the first composite rod are separated by layers of the second composite rod at the first location.

The joint of any of the preceding paragraphs, wherein the first and second shells are metal and are joined together with metallic fasteners.

The joint of any of the preceding paragraphs, wherein the first and second shells are thermoplastic materials and are joined together by at least one of welding, co-consolidation, and a metallic fastener.

The joint of any of the preceding paragraphs, wherein the first and second shells are thermoset materials and are joined together by at least one of an adhesive, co-curing, and a metallic fastener.

The joint of any of the preceding paragraphs, wherein each of the first and second shells includes a plurality of holes configured for connecting an optical device to the composite frame or for connecting the composite frame to another structure.

A composite frame for an optical device includes a plurality of joints according to any of the preceding paragraphs.

A method of forming joints of composite frame includes forming a composite frame by interconnecting a plurality of composite rods formed by an Automated Fiber Placement (AFP) manufacturing method around a mandrel, applying a first shell to the plurality of composite rods at a first location where composite rods of the plurality of composite rods are interconnected, applying a second shell to the plurality of composite rods at the first location, wherein the second shell is disposed opposite the first shell relative to the composite rods, and joining the first and second shells together with the plurality of composite rods at the first location disposed between the first and second shells.

The method of the preceding paragraph can optionally include, additionally and/or alternatively, any one or more of the following features, configurations, additional components, and/or steps:

The method of any of the preceding paragraphs, wherein the first shell is applied to the mandrel prior to forming the composite frame and wherein forming the composite frame includes automated placement of a composite rod on the top of the first shell.

The method of any of the preceding paragraphs, wherein the first and second shells are metal and are joined together by metallic fasteners.

The method of any of the preceding paragraphs, wherein the first and second shells are thermoplastic materials and are joined together by at least one of welding, co-consolidation, and a metallic fastener.

The method of any of the preceding paragraphs, wherein the first and second shells are thermoset materials and are joined together by at least one of an adhesive, co-curing, and a metallic fastener.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A joint for a composite frame, the joint comprising:
   a first composite rod;
   a second composite rod, wherein the first and second composite rods are interconnected at a first location;
   wherein each of the first composite rod and the second composite rod comprises layers of a fiber-reinforced polymer-matrix composite material, and wherein layers of the first composite rod are separated by layers of the second composite rod at the first location;
   a first shell abutting the first composite rod and the second composite rod;
   a second shell abutting the first composite rod and the second composite rod, the second shell disposed opposite the first shell relative to the first composite rod and the second composite rod; and
   wherein each of the first shell and the second shell comprises:
      a first groove configured to accommodate the first composite rod;
      a second groove configured to accommodate the second composite rod; and
      a depression disposed at an intersection of the first groove and the second groove, the depression having a depth greater than each of the first groove and the second groove to accommodate the first composite rod and the second composite rods at the first location;
   wherein the first and second shells are joined together such that the first and second composite rods are fixed therebetween at the first location.

2. The joint of claim 1, wherein each of the first and second composite rods is a continuous composite rod extending beyond the first and second shells.

3. The joint of claim 1, wherein the first composite rod is a continuous composite rod, and the second composite rod is a discontinuous composite rod having a terminal end disposed between the first and second shells.

4. The joint of claim 3, wherein the second groove of each of the first and second shells is discontinuous to accommodate the terminal end, such that the first and second shells are joined around the terminal end.

5. The joint of claim 1, and further comprising:
a third composite rod;
wherein the third composite rod is a continuous composite rod or a discontinuous composite rod having a terminal end disposed between the first and second shells or beyond the first and second shells; and
wherein the third composite rod, the first composite rod, and the second composite rod are interconnected at the first location such that layers of the first composite rod are separated by layers of the second composite rod and the third composite rod at the first location and within the depression.

6. The joint of claim 5, wherein each of the first and second shells comprises:
a third groove configured to accommodate the third composite rod and wherein the depression has a depth to accommodate the third composite rod.

7. The joint of claim 6, wherein the third composite rod is a discontinuous composite rod having a terminal end disposed between the first and second shells.

8. The joint of claim 7, wherein the third groove of each of the first and second shells is discontinuous to accommodate the terminal end, such that the first and second shells are joined around the terminal end.

9. The joint of claim 1, wherein the first and second shells are metal and are joined together with metallic fasteners.

10. The joint of claim 1, wherein the first and second shells are thermoplastic materials and are joined together by at least one of welding, co-consolidation, and a metallic fastener.

11. The joint of claim 1, wherein the first and second shells are thermoset materials and are joined together by at least one of an adhesive, co-curing, and a metallic fastener.

12. The joint of claim 1, wherein each of the first and second shells includes a plurality of holes configured for connecting an optical device to the composite frame or for connecting the composite frame to another structure.

13. A composite frame for an optical device, the composite frame comprising a plurality of the joints of claim 1.

* * * * *